United States Patent
Lai et al.

(10) Patent No.: US 9,798,569 B2
(45) Date of Patent: Oct. 24, 2017

(54) SYSTEM AND METHOD FOR RETRIEVING VALUES OF CAPTURED LOCAL VARIABLES FOR LAMBDA FUNCTIONS IN JAVA

(71) Applicant: Nvidia Corporation, Santa Clara, CA (US)

(72) Inventors: Michael Lai, Santa Clara, CA (US); Vinod Grover, Santa Clara, CA (US); Sean Lee, Redmond, WA (US); Jaydeep Marathe, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 25 days.

(21) Appl. No.: 15/043,695

(22) Filed: Feb. 15, 2016

(65) Prior Publication Data
US 2017/0235586 A1    Aug. 17, 2017

(51) Int. Cl.
G06F 9/455    (2006.01)
G06F 9/445    (2006.01)

(52) U.S. Cl.
CPC ...... *G06F 9/45558* (2013.01); *G06F 9/44521* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 2008/0244516 A1* | 10/2008 | Meijer | ............... | G06F 8/315 717/116 |
| 2011/0314444 A1* | 12/2011 | Zhang | ............... | G06F 8/45 717/106 |
| 2013/0268258 A1* | 10/2013 | Patrudu | ............... | G06F 17/28 704/2 |
| 2014/0019948 A1* | 1/2014 | Goetz | ............... | G06F 8/437 717/143 |
| 2014/0123118 A1* | 5/2014 | Goetz | ............... | G06F 8/41 717/140 |
| 2015/0347269 A1* | 12/2015 | Nelson | ............... | G06F 11/362 717/134 |
| 2016/0092205 A1* | 3/2016 | Seovic | ............... | G06F 8/68 717/170 |

OTHER PUBLICATIONS http://web.archiye.org/web/20160204190350/http://cropenjdkjaya.nethbriangoetz/lambda/lambda-translation.html; Translation of Lambda Expression; Apr. 2016.*

(Continued)

*Primary Examiner* — Dong Kim
(74) *Attorney, Agent, or Firm* — Iain Cunningham; Parker Justiss, P.C.

(57) ABSTRACT

A system for and method of retrieving values of captured local variables for a lambda function in Java. In one embodiment, the system includes: (1) a Java virtual machine and (2) a captured variable retriever that interacts with the Java virtual machine and configured to retrieve a signature of the lambda function from a classfile of a Java class containing the lambda function, compare the signature with a declaration of the lambda function to identify arguments corresponding to the captured local variables, modify the lambda function and cause the Java virtual machine to execute the modified lambda function.

12 Claims, 1 Drawing Sheet

(56) References Cited

OTHER PUBLICATIONS

Figure 1:
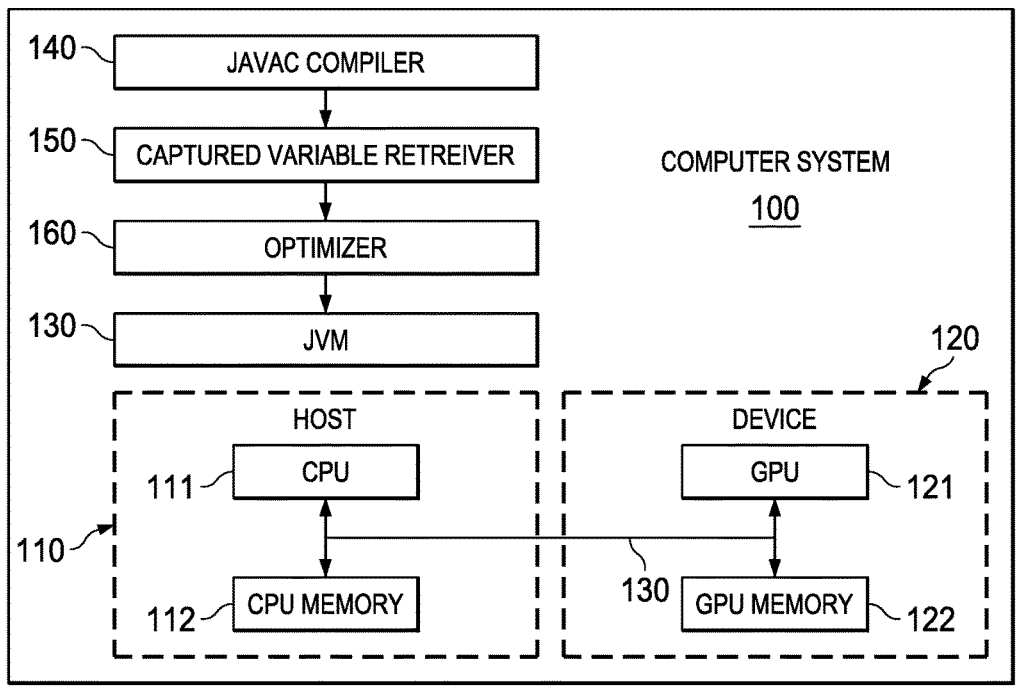

Dr. Dobb's, The World of Software Development; "Lambda Expressions in JAVA 8"; http://www.drdobbs.com/jvm/lambda-expressions-in-java-8/240166764; Mar. 25, 2014; 8 pages.
Patel, Viral; "JAVA 8 Lambda Expressions Tutorial with Examples"; http://viralpatel.net/blogs/lambda-expressions-java-tutorial/; Jan. 29, 2014; 24 pages.
Moore, Jr., John I.; "JAVAWORLD, JAVA Programming with Lambda Expressions, A Mathematical Example Demonstrates the Power of Lambdas in JAVA 8"; http://www.javaworld.com/article/2092260/java-se/java-programming-with-lambda-expressions.html; Jan. 28, 2014; 6 pages.

* cited by examiner

SYSTEM AND METHOD FOR RETRIEVING VALUES OF CAPTURED LOCAL VARIABLES FOR LAMBDA FUNCTIONS IN JAVA

TECHNICAL FIELD

This application is directed, in general, to the Java programming language and, more specifically, to a system and method for retrieving values of captured local variables for lambda functions in Java.

BACKGROUND

Over its more-than-20 year history, software developers have written scores of applications in the Java object-oriented programming language. (A major implementation of Java is commercially available from Oracle Corporation of Redwood City, Calif.) Java was developed with a "write once, run anywhere" philosophy, meaning that its primary advantage is cross-platform compatibility. Accordingly, Java is designed to execute on a virtual machine, a Java Virtual Machine, or "JVM," to be exact. While various central processing units (CPUs) host JVM implementations written specifically for them, the JVMs themselves are designed to present the same virtual computing environment to applications written in Java ("Javacode"). Java bytecode is called "bytecode."

Nvidia Corporation of Santa Clara, Calif., has developed a Java library, called "Java on GPU," or JoG. JoG introduces new Java classes that allow developers to accelerate the execution of Java applications on computer systems having a GPU in addition to the CPU that hosts the JVM. The GPU serves as a device relative to the host CPU. Software development tools that incorporate JoG allow automatic GPU acceleration of Java bytecode without too much special effort on the developer's part: after the JoG library is incorporated, the developer only needs to make minor changes to the Java source code to enable the automatic GPU acceleration. JoG and the tools designed to incorporate it bring to Java the remarkable processing power GPUs can provide, assuming their power is properly used.

In Java, a lambda function, sometimes simply called a "lambda," is a functional interface that returns a value for specific formal input parameters. Following is a declaration of a lambda function that serves as an example:

lambda_add1=(x)→x+1.

Lambda_add1 is a lambda function that returns a value that is "x" incremented by one. In this example, "x" is a formal parameter.

However, lambda functions can also use variables that do not appear as formal parameters. Following is a declaration of a lambda function that uses a variable that does not appear as a formal parameter:

lambda_saxpy=(x,y)→scalar*x+y.

Lambda_saxpy is a lambda function that returns a value that is "scalar" multiplied by "x" and then added to "y." In this example, "x" and "y" are formal parameters, but "scalar" is not. "Scalar" is instead a captured local variable. A captured local variable is so-called, because its value is captured when the lambda function is declared and stored as part of the lambda function. For this reason, a lambda function that employs one or more captured local variables is not completely defined until it is given its body (code) and the values of all of its captured local variables.

SUMMARY

One aspect provides a system for retrieving values of captured local variables for a lambda function in Java. In one embodiment, the system includes: (1) a Java virtual machine and (2) a captured variable retriever that interacts with the Java virtual machine and configured to retrieve the signature of the lambda function from a classfile of a Java class containing the lambda function, compare the signature with a declaration of the lambda function to identify arguments corresponding to the captured local variables, modify the lambda function, and cause the Java virtual machine to execute the modified lambda function.

Another aspect provides a method of retrieving values of captured local variables for a lambda function in Java. In one embodiment, the method includes: (1) retrieving the signature of the Java lambda function from a classfile of a Java class containing the lambda function, (2) comparing the signature with a declaration of the lambda function to identify arguments corresponding to the captured local variables, (3) modify the lambda function and (4) causing the Java virtual machine to execute the modified lambda function.

BRIEF DESCRIPTION

Figure 2:
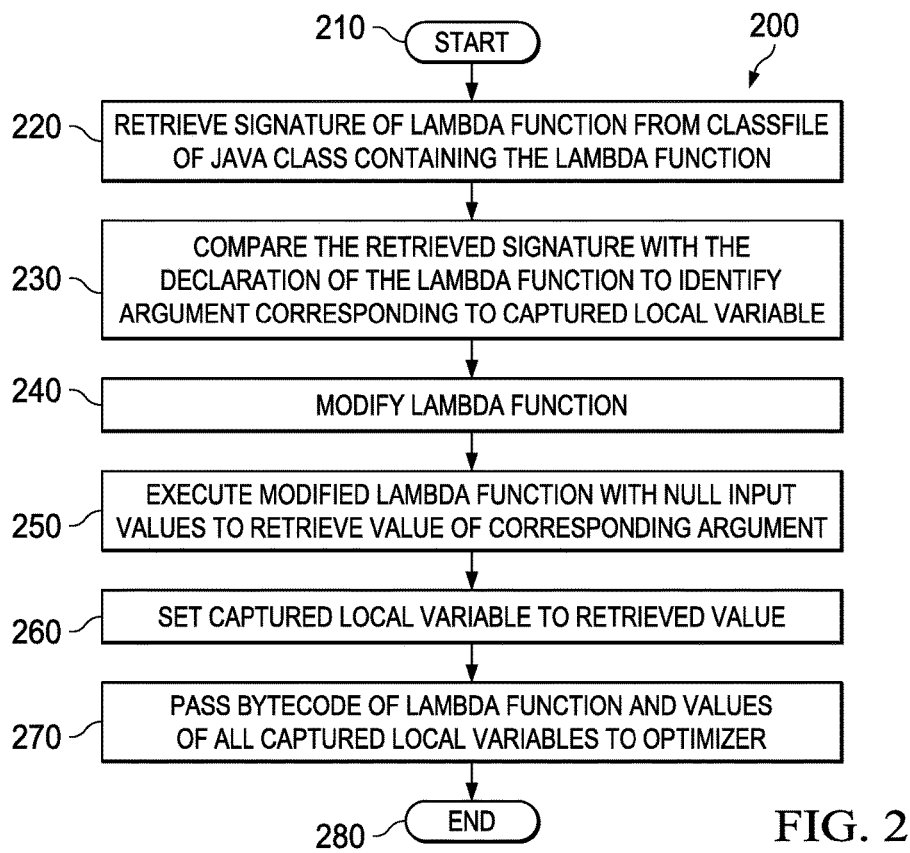

Reference is now made to the following descriptions taken in conjunction with the accompanying drawings, in which:

FIG. 1 is a block diagram of a computer system including one embodiment of a system for retrieving values of captured local variables for lambda functions in Java; and FIG. 2 is a flow diagram of one embodiment of a method of retrieving values of captured local variables for lambda functions in Java.

DETAILED DESCRIPTION

As stated above, a Java lambda function that employs one or more captured local variables is not completely defined until it is given its body (code) and the values of all of its captured local variables. It is often useful for tools such as JoG to process a completely defined lambda function, well before the lambda function of interest is being invoked.

Unfortunately, the values of the captured local variables for the lambda function are not easily accessible. In fact, many Java systems implement lambda functions using the "invokedynamic" Java instruction, which means that the actual lambda function construction is deferred until invocation time, when the lambda function body, along with the values of the captured local variables, are fed to a "Lambda functionMetafactory" to construct the actual lambda function. Many of these implementations even warn that the locations where the captured local variables are actually stored are implementation-dependent. All this provides a significant obstacle to tools that do not directly interact with the JVM.

It is realized herein that the construction of lambda functions need not be delayed until their original invocation time. It is further realized herein that it is possible to construct lambda functions before their original invocation time without having to rely on any particular implementation of JVM.

It is realized herein that, the body of the lambda function (its bytecode) is accessible, being included in the classfile of the Java class that contains the lambda function. It is further realized herein that, though the values of the captured local variables are not known, their signatures are, and in fact can be found in the signature of the lambda function. The signature of the lambda function contains signatures of all the formal parameters as well as all the captured local variables.

The foregoing realizations lead to a novel system and method, which may be carried out in the form of another Java method, e.g., "RetrieveValuesForCapturedVars( )" that: (1) invokes the lambda function of interest with a null value passed to each corresponding formal parameter of the lambda function and (2) returns the values of all the captured local variables. This novel method also modifies the lambda function being invoked such that it operates in this manner only when called by "RetrieveValuesForCapturedVars( )" Those skilled in the pertinent art will understand that since the values passed to the corresponding formal parameters of the lambda function are not used in the modified lambda function when the scalar variable "special" is set to true, the null values can be replaced by any other values in practice.

FIG. 1 is a block diagram of a computer system including one embodiment of a system for retrieving values of captured local variables for lambda functions in Java. The computer system 100 has a host 110 that includes a CPU 111 and associated CPU memory 112. The computer system also has a device 120 that includes a GPU 121 and associated GPU memory 122. A bus 130 couples the CPU 111, CPU memory 112, GPU 121 and GPU memory 122 together. It will be apparent to those skilled in the pertinent art that the illustrated computer system 100 is rudimentary. For example, most computer systems have a more complex bus than the bus 130. Indeed, most computer systems have multiple buses and bus levels for interconnecting their CPUs, GPUs and associated memory.

The hardware of the computer system 100 is illustrated conceptually. This is done in part to indicate the relationship between the host 110 and the device 120 and to show that, in the computer system 100 embodiment, data on which the CPU 111 operates is stored in the CPU memory 112, and data on which the GPU 121 operates is stored in the GPU memory 122. Accordingly, data may need to be moved between the CPU memory 112 and the GPU memory 122 as necessary to allow appropriate processing.

A JVM 130 is configured to be supported by (execute on) the host 110. The JVM 130 itself is configured to provide an environment within which software programs written in Java may execute. As those skilled in the pertinent art understand, Java programs may include one or more lambda functions that may be compiled into GPU programs that will invoke processing resources provided by a device (e.g., the device 120). The lambda functions may employ captured local variables that the JVM 130 stores and makes available at runtime. As described above, the system and method introduced herein allow the values of captured local variables to be acquired well before the original invocation time of the lambda functions.

As those skilled in the pertinent art understand, Java employs a javac compiler 140 that compiles Java source code into Java bytecode, which can then be passed to the JVM for execution, or to an optimizer 160 which optimizes the bytecode into optimized equivalent bytecode and passes the same to the JVM for execution. In the illustrated embodiment, a captured local variable retriever 150 lies architecturally after the javac compiler 140 and is configured to retrieve any captured local variables employed by lambda functions, thus providing completely defined lambda functions for the optimizer 160. As will be illustrated more particularly in conjunction with FIG. 2, the captured local variable retriever 150 is configured to (1) retrieve the signature of the lambda functions from classfiles of the Java classes containing the lambda functions, (2) compare the retrieved signature with the declarations of the lambda functions to identify the arguments corresponding to the captured local variables, (3) modify the lambda functions, (4) execute the modified lambda functions with a null value passed to each corresponding formal parameter of the lambda functions to retrieve the values of the corresponding arguments for the captured local variables, (5) set the captured local variables to the retrieved values and (6) pass the bytecode of the lambda functions, along with the retrieved values of the captured local variables to the optimizer. Those skilled in the pertinent art will understand that since the values passed to the corresponding formal parameters of the lambda function are not used in the modified lambda function when the scalar variable "special" is set to true, the null values can be replaced by any other values in practice.

Turning to FIG. 2, illustrated is a flow diagram of one embodiment of a method 200 of retrieving values of captured local variables for lambda functions in Java. The method starts in a start step 210. The method will be applied to an example using the second lambda function given in the Background above, namely lambda_saxpy:

$$\text{lambda\_}saxpy=(x,y)\to\text{scalar}x+y.$$

First, lambda_saxpy's signature is retrieved from the classfile of the Java class that contains lambda_saxpy in a step 220. Those skilled in the pertinent art know how to retrieve the signature of a lambda function from a Java classfile. In this embodiment, the signature of lambda_saxpy is:

$$\text{float lambda\_}saxpy(\text{float arg0,float arg1,float arg2}).$$

Next, lambda_saxpy's signature is compared with its declaration (with its two formal parameters, "x" and "y" and captured local variable, "scalar") to determine that the captured local variable, "scalar," corresponds to "arg0."

With this knowledge in-hand, the value of arg0 may be retrieved well before the original invocation time of lambda_saxpy. First, a modified lambda_saxpy is constructed as follows:

TABLE 1

Modified Lambda_saxpy Lambda function

```
float lambda_saxpy(float arg0, float arg1, float arg2) {
    if (special) {
        captured_value = arg0;
        return 0.0f;
    }
    // remainder of lambda_saxpy code unchanged as before
}
```

Next, a new routine, e.g., RetrieveValuesForCapturedVars( ) is constructed as follows:

TABLE 2

Method to Execute Modified Lambda_saxpy

```
float RetrieveValuesForCapturedVars( ) {
    special = true;
    lambda_saxpy.execute(0.0f, 0.0f);
    special = false;
    return captured_value;
}
```

It is clear that the new routine sets a Boolean variable, "special," that was added to lambda_saxpy to true, calls for the execution of lambda_saxpy and then resets special to false. In a step 250, when lambda_saxpy is executed with special set to true, the variable "arg0" contains the value of the captured variable "scalar." In a step 260, this value is stored in a special variable ("captured_value"), completing the value retrieval process. In a step 270, all the retrieved values of the captured local variables, along with the bytecode of the lambda functions, can then be passed to Java libraries or tools such as JoG, which can then use the information to generate optimized GPU programs that can be executed on GPU devices, for example. The method ends in an end step 280.

Those skilled in the pertinent art will understand that the above approach may be adapted to accommodate any number of captured local variables and of different data types. Those skilled in the art to which this application relates will also appreciate that other and further additions, deletions, substitutions and modifications may be made to the described embodiments.

What is claimed is:

1. A system for retrieving a value of a captured local variable for a lambda function in Java, comprising:
    a Java virtual machine executed on a host processor; and
    a captured variable retriever that interacts with said Java virtual machine and configured to retrieve a signature of said lambda function from a classfile of a Java class containing said lambda function, compare said signature with a declaration of said lambda function to identify an argument corresponding to said captured local variable, modify said lambda function using said argument and cause said Java virtual machine to execute said modified lambda function with a null value passed to each corresponding formal parameter of said lambda function.

2. The system as recited in claim 1 wherein said captured variable retriever is further configured to retrieve and return a value of said argument when said Java virtual machine executes said modified lambda function and set said captured local variable to said value.

3. The system as recited in claim 1 wherein said captured variable retriever is further configured to pass said lambda function along with value of said captured local variable to a compiler that compiles said lambda function into an intermediate representation.

4. The system as recited in claim 3 wherein said captured variable retriever is further configured to invoke an optimizer that optimizes said intermediate representation and generates code that can execute on a device.

5. The system as recited in claim 4 wherein said device is a graphics processing unit.

6. The system as recited in claim 1 wherein said lambda function includes multiple captured local variables and said captured variable retriever is configured to retrieve values of all said multiple captured local variables.

7. A method of retrieving a value of a captured local variable for a lambda function in Java, comprising:
    retrieving a signature of said lambda function from a classfile of a Java class containing said lambda function;
    comparing said signature with a declaration of said lambda function to identify an argument corresponding to said captured local variable;
    modify said lambda function using said argument; and
    causing a Java virtual machine to execute said modified lambda function with a null value passed to each corresponding formal parameter of said lambda function.

8. The method as recited in claim 7 wherein said causing comprises:
    retrieving and returning a value of said argument; and
    setting said captured local variable to said value.

9. The method as recited in claim 7 further comprising passing said lambda function along with value of said captured local variable to a compiler that compiles said lambda function into an intermediate representation.

10. The method as recited in claim 9 further comprising invoking an optimizer to optimize said intermediate representation and generate code that can execute on a device.

11. The method as recited in claim 10 wherein said device is a graphics processing unit.

12. The method as recited in claim 7 wherein said lambda function includes multiple captured local variables and said method further comprises retrieving values of all said multiple captured local variables.

* * * * *